United States Patent
Lee (10) Patent No.: US 8,196,537 B2
(45) Date of Patent: Jun. 12, 2012

(54) TANDEM/CANARD WIG BOAT WITH SUSPENSION SYSTEMS

(76) Inventor: Hee-Seoung Lee, Chungcheongnam-do (KR)

( * ) Notice: Subject to any disclaimer, the term of this patent is extended or adjusted under 35 U.S.C. 154(b) by 294 days.

(21) Appl. No.: 12/522,069

(22) PCT Filed: Feb. 13, 2008

(86) PCT No.: PCT/KR2008/000859
§ 371 (c)(1),
(2), (4) Date: Sep. 23, 2009

(87) PCT Pub. No.: WO2008/102959
PCT Pub. Date: Aug. 28, 2008

(65) Prior Publication Data
US 2010/0043690 A1   Feb. 25, 2010

(30) Foreign Application Priority Data
Feb. 20, 2007   (KR) ................... 10-2007-0016908

(51) Int. Cl.
*B63B 1/16*   (2006.01)
*B63B 1/32*   (2006.01)
*B60V 1/08*   (2006.01)
*B60V 3/06*   (2006.01)
*B60V 3/08*   (2006.01)
*B64C 35/00*   (2006.01)

(52) U.S. Cl. ....... 114/67 A; 114/272; 114/284; 180/116; 244/45 R; 244/105

(58) Field of Classification Search ............... 114/67 A, 114/271–284; 180/116–122; 244/2, 12.1, 244/45 R–45 A, 101, 105, 106; D12/2–5
See application file for complete search history.

(56) References Cited

U.S. PATENT DOCUMENTS

| | | | |
|---|---|---|---|
| 2,390,859 A * | 12/1945 | Warner | 244/15 |
| 3,908,783 A * | 9/1975 | Joerg et al. | 180/116 |
| 4,881,701 A | 11/1989 | Bullard | |
| 5,267,626 A * | 12/1993 | Tanfield, Jr. | 180/117 |
| 5,314,035 A * | 5/1994 | Schoell | 180/119 |
| 5,566,775 A * | 10/1996 | Schoell | 180/120 |
| 5,653,189 A | 8/1997 | Payne | |
| 6,158,540 A * | 12/2000 | Rice et al. | 180/117 |
| 6,164,591 A | 12/2000 | Descatha | |
| 6,325,011 B1 | 12/2001 | Klem | |
| 6,732,672 B2 * | 5/2004 | Shin et al. | 114/272 |
| 7,040,574 B2 * | 5/2006 | Richards | 244/105 |
| 7,735,775 B2 * | 6/2010 | Ellnor | 244/45 A |
| 2001/0045492 A1 | 11/2001 | Lewis | |

FOREIGN PATENT DOCUMENTS

| JP | 02262461 A * | 10/1990 |
|---|---|---|
| JP | 04024159 A * | 1/1992 |
| KR | 10-2003-0029349 | 4/2003 |

* cited by examiner

*Primary Examiner* — Ajay Vasudeva
(74) *Attorney, Agent, or Firm* — Christopher Paul Mitchell (57) ABSTRACT

This WIG craft has a configuration of tandem/canard type, comprising: a body; a front wing having a relatively small aspect ratio, as installed in the lowest portion of the fore half of the body; and a rear wing having a longer span and a shorter chord length than the front wing, as installed in the rearmost portion of the body. Since the front wing, which is also used for planing, is not fixed directly to the body, but installed through a suspension system, so as to travel up and down while planing along the rough water surface, the WIG craft can take off and land stably even in high waves, and further cruise at a extremely low height safely without worrying about the impacts of the wave.

6 Claims, 6 Drawing Sheets

TANDEM/CANARD WIG BOAT WITH SUSPENSION SYSTEMS

RELATED APPLICATIONS

This application is a 371 application of International Application No. PCT/KR2008/000859, filed Feb. 13, 2008, which in turn claims priority from Korean Patent Application No. 10-2007-0016908, filed Feb. 20, 2007, both of which are incorporated herein by reference.

TECHNICAL FIELD

The present invention relates to the WIG crafts flying just above the water surface using the ground effect, more particularly, a tandem or canard WIG craft having two wings arranged in the front and in the rear.

BACKGROUND ART

The WIG crafts use the ground effect that when the wing of a flying vehicle flies near the ground (or the water surface), the descent airflow gets to be screened by the ground (or the water surface), and thereby, the lift force gets to be increased and the drag gets to be decreased. Most modern high speed marine crafts have lift-to-drag ratios (L/D) of below 10 and most airplanes have lift-to-drag ratios of 10~20. In comparison with them, the wig crafts using the ground effect can have lift-to-drag ratios of as high as 20~30. Thus, the wig crafts have high fuel efficiency and can fly at the speed of general propeller aircrafts without being in direct contact with the water.

The WIG craft having such features can perform various roles in the middle field between boats and airplanes, and the WIG craft born for a low-level flight only is classified as a boat by the International Maritime Organization.

In 1960's, the early models of the wig crafts, the X-112 made by Alexander Lippisch and the SM-2P made by Rostislav Alexeiev flew successfully. Since then, many studies on the WIG craft have been performed and as a result, various types of the WIG crafts have appeared, for examples, the reversed delta wing type (i.e. FS-8, X-114, Hover-Wing, etc.); the Ekranoplan type (i.e. KM, Orlyonok, etc.); the tandem type (i.e. Joerg tandem, etc.); the ram wing type (i.e. KAG-3, Volga-2, Amphistar, etc.); the canard type (i.e. Kaien series of TOTTORI University, etc).

Figure 1:
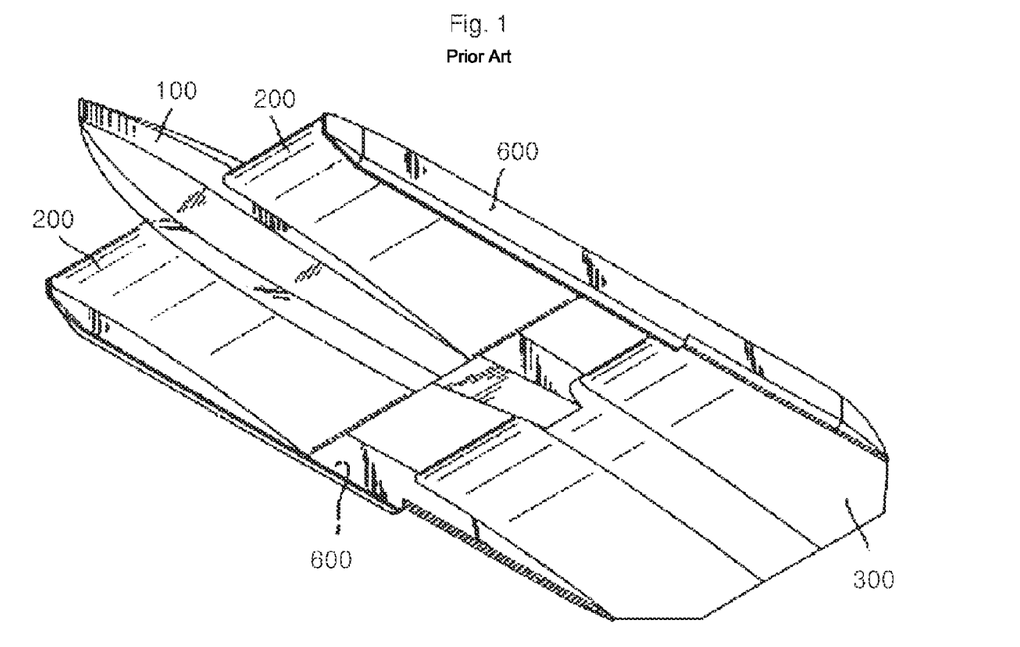
FIG. 1 is a perspective view illustrating lower part of a prior tandem WIG craft.
Figure 2:
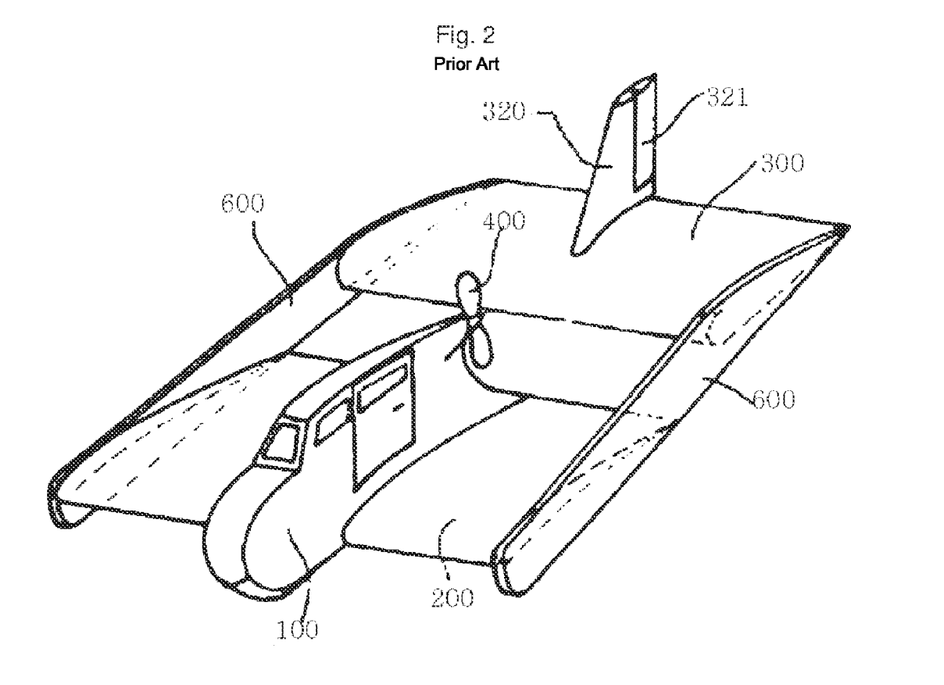
FIG. 2 is a perspective view illustrating another prior tandem WIG craft.

The Joerg tandem wig craft, one of the prior wig crafts, is illustrated in FIGS. 1 and 2. The wig craft comprises: a body 100; a front wing 200 having an aspect ratio of 1~1.5 as positioned in the low front side of the body; a rear wing 300 having almost the same area and the same span as the front wing, which is positioned a little apart in the rear with the same level as the front wing; a right end plate and a left end plate 600 connecting the end of the front wing with that of the rear wing respectively; a propeller 400 in the rear of the body 100; a vertical stabilizer 320; and a rudder 321.

The way how to fly the WIG craft is explained as follows. When thrust is generated by the propeller, the body and the wings, which were partly immersed under the water surface providing buoyancy at rest, rise onto the water surface by hydrodynamic lift and then the WIG craft starts to plane. As its speed goes higher, the aerodynamic lift in ground effect gets to be increased. And when it has accelerated enough, the WIG craft rises above the water surface and continues to cruise. When the WIG craft gets to fly higher, the aerodynamic lift of the wings of small aspect ratios gets to be decreased rapidly due to the weakened ground effect, and the front wing and the rear wing maintain their height and attitude through the ground effects on fore and rear, and right and left sides. Since the said wings have no elevator, the WIG craft's cruising height and speed get to be determined by thrust. Meanwhile, the WIG craft cannot fly high up in the air due to the stability problem.

DISCLOSURE OF INVENTION

Technical Problem

The WIG craft has advantages in the aspects of speed and fuel efficiency. However, some problems have prevented the WIG craft from being commercialized successfully even until now when about 40 years has passed since the successful advent of the said initial models. Such problems could be summarized as follows:

In the first place, the WIG craft flies effectively just above calm water, but it cannot take off nor land on the high waves. Therefore, the number of operating days per year is limited. As a result, its economic efficiency becomes rather poor.

In the second place, there are structural and aerodynamic losses caused by the large and high tail which is attached out of the realm of the ground effect in most of WIG crafts in order to overcome the instability of the ground effect itself that the center of lift moves to the front when the wing is high and to the rear when the wing is low.

And the ground effect gets to be weakened at the high cruising height ensuring a safe flight to avoid the risk of colliding with the waves, which leads to low economic efficiency of the WIG craft.

Furthermore, the power required only when the WIG craft takes off from the water should be greater several times than the power used while the WIG craft is cruising, which leads to low economic efficiency of the WIG craft.

In order to solve the said problems, various attempts have been made, including application of the power augmented ram, application of the wave piercing hull and application of the hydrofoil, but no satisfactory result has been produced until now.

Technical Solution

Some methods have been introduced into the present invention in order to solve the said problems:

Firstly, the aspect ratio (A/R) of the front wing 200 is made to be 2~5 to obtain a sufficient lift-to-drag ratio even above the high waves.

Secondly, the planing hull, which protrudes usually below the wing, is eliminated and the front wing is made to plane on the water by itself, and thereby, the front wing can come as close to the water surface as possible during cruising of the WIG craft to increase the lift-to-drag ratio by maximizing the ground effect Thirdly, the wing is made to have the shock-absorbability through a shock absorber, in order to reduce the shocks that the wing close to the water surface may get to receive when it collides with the waves.

Fourthly, the trailing edge of the front wing, which touchs the water the most, is made to be close to the center of gravity 140 of the WIG craft to minimize the disturbance caused by the said impacts and to keep the balance while the WIG craft planes.

Fifthly, the rear wing 300, having almost the same area as the front wing to keep the balance of lift force, is made to be positioned higher than the front wing in the rear end of the body 100, and thereby, the WIG craft is made to be of a tandem or canard configuration on the whole.

Sixthly, the span of the rear wing is made to be longer than that of the front wing to decrease the effect of the downwash of the front wing.

Seventhly, the vertical stabilizers 320 are attached upward to both ends of the rear wing to ensure the directional stability and the lateral stability through the dihedral effect.

Eighthly, the front wing, which is also used for planing, is made to have sufficient damping strokes through the suspension system 230 to enable the WIG craft to take off from and land on even the high waves stably.

ADVANTAGEOUS EFFECTS

The said methods enables the WIG craft to take off and land stably by stabilizing its body even in the high waves and further fly very low by minimizing a risk of attitude disturbance arising from the collision with the waves, and further increases its practicality by making it to operate on rough water as well as to maintain a high lift-to-drag ratio by extreme ground effect.

BEST MODE FOR CARRYING OUT THE INVENTION

The WIG craft according to the present invention is of a tandem or canard type, which is characterized by comprising a body; a front wing of relatively small aspect ratio (A/R), which is installed in the lowest part of the fore half of the body; a rear wing of longer span and shorter chord length than the front wing and so having almost the same area as the front wing, which is installed a little higher than the front wing in the lower part of the rear end of the body; a pair of vertical stabilizers installed on both ends thereof; and a propeller installed in the rear of the body, above the rear wing.

Further, the WIG craft according to the present invention is characterized by the points that the planing hull, which is usually fixed below the wing, is eliminated, and that the front wing is made to plane on the water surface by itself when the WIG craft takes off from and lands on the water, and that while the WIG craft is cruising, the wing is made to come as close to the water surface as possible and thereby the ground effect is maximized, and that the front wing is made to have the shock absorbability through the suspension systems of some types so that the WIG craft can take off from and land on the water and fly low with ease even when the waves are high.

First Embodiment

The first embodiment, which is the best mode to embody the present invention, is explained in detail by reference to FIG. 3 to FIG. 9.

The body 100 of the WIG craft according to the present invention provides buoyancy when the WIG craft is stationary, and includes a boarding part into which passengers or freights are loaded.

Figure 3:
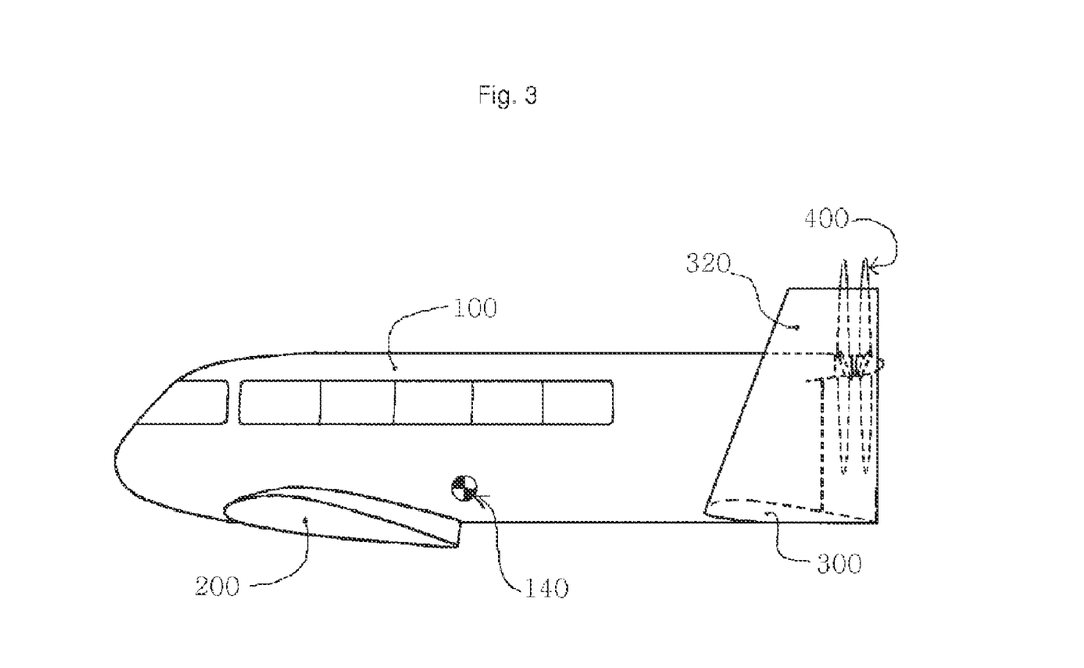
FIG. 3 is a side view illustrating the WIG craft according to the first embodiment of the present invention cruising.
Figure 4:
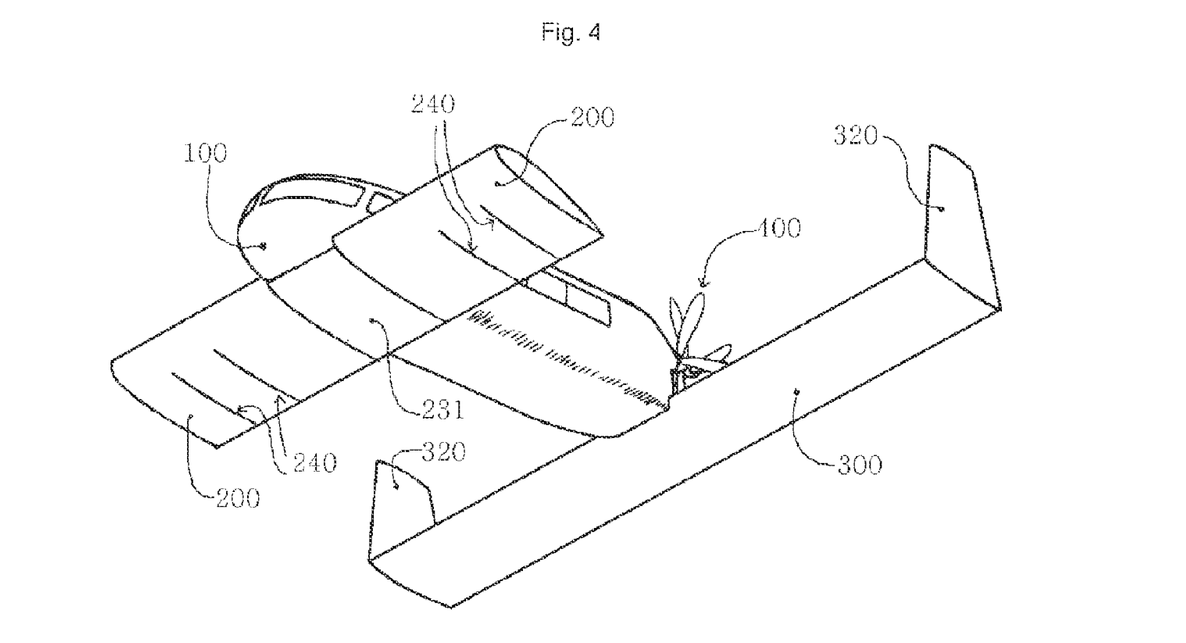
FIG. 4 is a perspective view illustrating the lower part of the WIG craft according to the first embodiment of the present invention cruising.

The front wing 200 is installed in the lowest part of the fore half of the body 100 with the suspension system 230 installed between them. The front wing 200 is positioned in the lowest part of the WIG craft as shown in FIGS. 3 and 4. While the WIG craft is at rest, the front wing 200 provides buoyancy. And while the WIG craft takes off from and lands on the water, the front wing 200 provides hydrodynamic lift also with aerodynamic lift. And while the WIG craft is flying, the front wing 200 provides aerodynamic lift in ground effect. Its aspect ratio is in the range of 2~5, and its thickness is around 16%. And it has a sufficient volume and its trailing edge is positioned just below the center of gravity 140 or in the part near to it.

Figure 8:
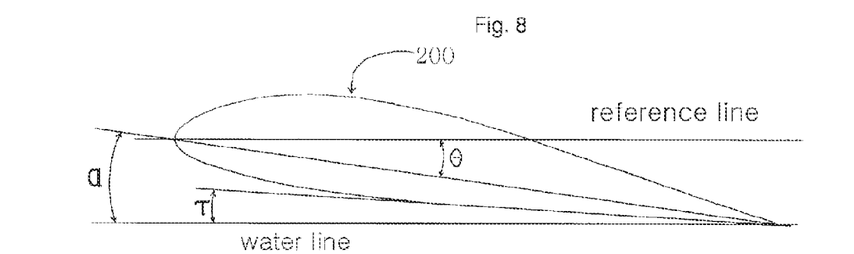
FIG. 8 is an enlarged cross-sectional view of the front wing used in the WIG craft.

As shown in FIG. 8, the airfoil section of the front wing 200 has a configuration that the fore part of the underside is slightly convex and the rear part thereof is almost flat, which is the same on the whole as the configuration of the bottom of the planing hull. Thus, if a suitable anhedral angle Γ and trim angle τ are maintained in it, it becomes a ultra-wide inverted V-section hydroplane so that it planes perfectly on the water. Since the front wing 200 has a relatively small aspect ratio while it is thick, it has high structural strength.

Further, since the front wing 200 has a relatively small aspect ratio, the variation of lift coefficient depending upon the variation of the angle of attack (dCl/dα) is not so sensitive, while the variation of lift coefficient depending upon the variation of the height (dCl/dh) at ultra-low altitudes is very sensitive so that a difference in the lift force through the ground effect is varied by as much as 50%. The said characteristic of the front wing 200, which is insensitive to the variation of the angle of attack a but sensitive to the ground effect, is very advantageous to ensure the longitudinal stability and the height stability of the WIG craft. Furthermore, since the front wing 200 of the WIG craft according to the present invention is designed to be positioned ahead of the center of gravity 140 of the WIG craft, the variation of lift force through the ground effect depending upon the variation in height leads to the variation in pitch, which is fed back to the variation in height so that it provides the robust height stability.

Figure 9:
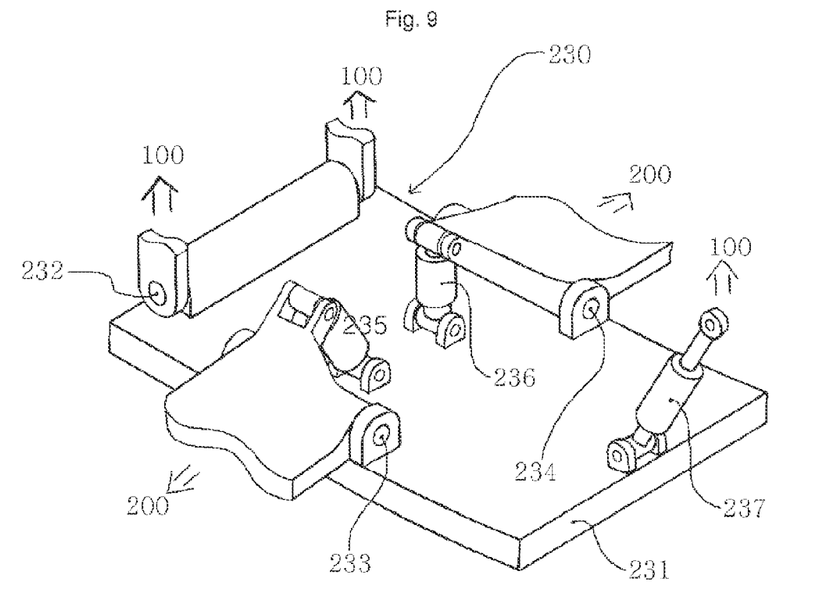
FIG. 9 is a conceptual diagram illustrating the suspension system of the front wing according to the first embodiment of the present invention.

The suspension system 230 is installed in the lower part of the fore half of the body 100 so that the angle of incidence θ and the anhedral angle Γ of the front wing 200 can be varied, and it comprises a wing mount plate 231, 3 sets of pivot axes 232, 233, 234 and shock absorbers 235, 236, 237, as shown in FIG. 9.

The wing mount plate 231 pivots about the first pivot axis 232 and its angle of incidence 0 to the body 100 is determined by the first shock absorber 237. The underside of the wing mount plate 231 has the same curvature as the right and the left front wings and it acts as a part of the front wing 200. The shock absorber is formed of a composite structure comprising an air spring, a hydraulic damper and an expansion limiter. The pressure of the air spring and the damping force of the hydraulic damper can be adjusted from the cockpit at all times when they are actively controlled. The expansion limiter is made to be of a hydraulic type or an electrical type. It limits the expansion length of the air spring depending upon the operating situation of the WIG craft and thereby; the angle of incidence θ and the anhedral angle Γ are maintained within the required range. The front wing 200 is designed so that it may have an angle of incidence θ of about 8 degrees basically, but it can be adjusted by the expansion limiter to change the altitude in high waves and to turn.

An impact caused by a collision with waves, which may happen in extremely low cruising, is absorbed by the first shock absorber 237 as front wing 200 pivots about the first pivot axis 232 decreasing the angle of incidence θ. And the trailing edge of the front wing 200, which mainly receives the hydrodynamic force, is near the center of gravity 140. Thus, the WIG craft can fly very low safely with minimum disturbance, and thereby, the extreme ground effect can be utilized.

The right and left front wings 200 are connected with the right and left sides of the wing mount plate 231 so that they may pivot up and down about the second pivot axis 233 and the third pivot axis 234. The said anhedral angle Γ is maintained and changed by the second shock absorber 235 and the third shock absorber 236 connecting between the wing mount plate 231 and the front wing 200. The anhedral angle Γ is maintained at 0~5 degrees while cruising, and it may varied upto 15~20 degrees at take off and land for sufficient damping stroke. The tips of the front wing 200 having small anhedral angle Γ may sometimes touch wave crests while cruising, and diminish wingtip vortices instead of the end plates or the winglets of the common WIG crafts. When the WIG craft takes off and lands in high waves, the tips of the right and left front wings 200 having great anhedral angle Γ plane along the waves traveling up and down, while the second and third shock absorbers stabilize the body 100 through sufficient damping strokes.

The pressure of the air springs of the suspension system 230 is appropriately adjusted so that they are contracted by an excessive force generated by the water and acting on the under side of the front wing 200, but not contracted by a normal force generated by the aerodynamic lift.

In the case of the front wing 200 having an aspect ratio of 4, it would have a lift-to-drag ratio of 30~35 at an ultra-low altitude, and it would maintain a lift-to-drag ratio of 15 and more even over relatively high waves.

The rear wing 300, which is apart from the front wing 200 by around the chord length of the front wing 200, is installed in the rear Of the body at a large angle of incidence wherefore its lift coefficient would be equal to or larger than that of the front wing 200 without the ground effect. Its span is 1.3~1.5 times longer than that of the front wing 200 and its chord length is shorter than that of the front wing 200. Each vertical stabilizer 320 is attached to both ends of the rear wing 300. The said vertical stabilizers 320 provide the directional stability and the lateral stability through the dihedral effect. Further, it performs a role to change a slide slip into a bank when the WIG craft changes direction, thereby, it enables the WIG craft to turn effectively.

Meanwhile, the rear wing 300 stabilizes the WIG craft by buoyancy when it is at rest. And it generates hydrodynamic lift when the WIG craft starts to accelerate for taking off. Also, it takes 30~50% of the load of the WIG craft by aerodynamic lift in ground effect when cruising. Since the rear wing 300 has longer span than the front wing 200, it receives upwashes generated at the outside of the wingtips of the front wing 200 so that the effect of downwash directly behind the front wing 200 is much offset, and with the relatively great aspect ratio of the rear wing 300 and the vertical stabilizers 320 attached to both ends, it provide the robust longitudinal stability to the WIG craft. The large angle of incidence and the larger lift coefficient of the rear wing 300 prevent the craft from getting out of the region of extreme ground effect by strong diving moment, and provides the robust height stability to the WIG craft. And the long rear wing 300, which is attached relatively low, also provides the robust lateral stability to the WIG craft through the ground effect.

In the case of the rear wing 300 having an aspect ratio of 6, it would have a lift-to-drag ratio of 30~35 when the water surface is calm, and it would maintain a lift-to-drag ratio of 20 and more even in high waves.

The propeller 400 is made to be of a low RPM type having wide area to decrease noise and to generate sufficient thrust at low speeds while the WIG craft takes off, and further to be of a coaxial or biaxial counter-rotating type to avoid the torque effect. The propeller 400 is installed in the upper end of the tail of the body 100. In the case that the propeller is of a coaxial type, it is installed so that it may pivot right and left, and thus, it is used for the purpose of changing direction like an outboard motor. In the case of biaxial counter-rotating type, rudders are installed in the slipstreams of the propellers, and thereby the WIG craft is able to change direction without any forward speed.

Now, the operation of the WIG craft according to the present invention is explained.

Figure 6:
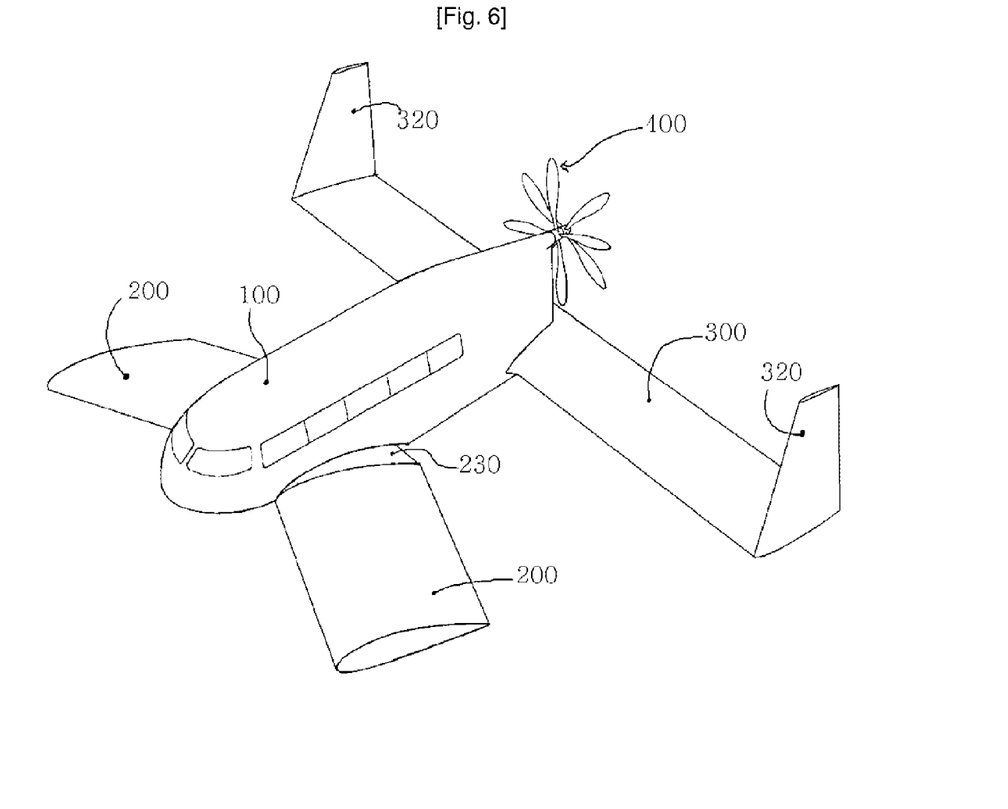
FIG. 6 is a perspective view illustrating the WIG craft according to the first embodiment of the present invention taking off and landing.
Figure 7:
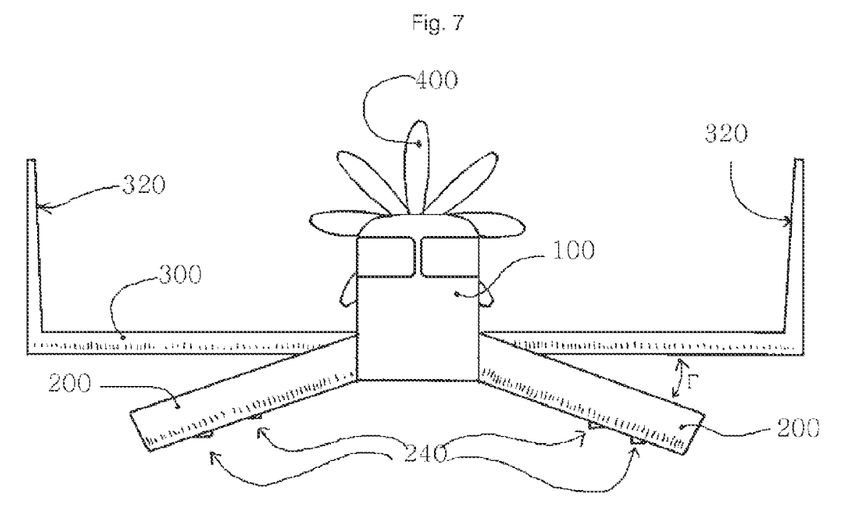
FIG. 7 is a front view illustrating the WIG craft according to the first embodiment of the present invention taking off and landing.

To take off from the water, the WIG craft, which was at rest on the water surface by the buoyancy of the body 100, the front wing 200 and the rear wing 200, works to let the front wing 200 have large anhedral angle Γ as shown in FIGS. 6 and 7 and form the inverted V-section hydroplane configuration by activating the second and third shock absorbers 235, 236. And then, it gets to accelerate by the propeller 400. When the WIG craft starts to accelerate, the front wing 200 plays a role of the hydrofoil for a moment. After the WIG craft has somewhat accelerated, the front wing 200 generates hydrodynamic lift and it planes with only the underside of the wing tips being in touch with the water.

Meanwhile, the rear wing 300 also generates hydrodynamic lift when the WIG craft Starts to accelerate, but it soon rises to the air by lift force through the extreme ground effect so that it decreases the resistance by the water and maintains the front wing at the angle suitable for planing.

During the take off run, the impacts and the up and down movements resulting from waves are alleviated and cleared by the second shock absorber 235 and the third shock absorber 236 so that the body 100 gets to be stabilized.

The high speed planing state, where two points of the WIG craft is in touch with the water surface, is an interim process for the WIG craft to take off from or land on the water, but it may be used for a long time to maintain an accurate course, if necessary, i.e., when the WIG craft passes through a narrow waterway.

Figure 5:
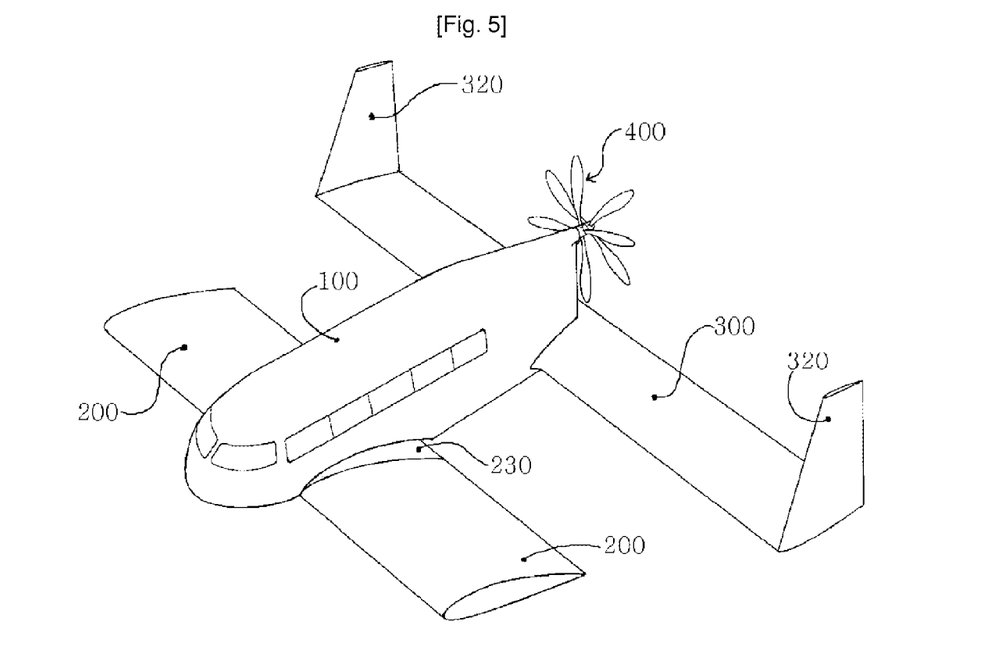
FIG. 5 is a perspective view illustrating the WIG craft according to the first embodiment of the present invention cruising.

When sufficient lift force is generated in the front wing 200 and the rear wing 300, so the tips of the front wing 200 have taken off from the water, the WIG craft shifts to the cruise flight state by adjusting the anhedral angle Γ of the front wing 200 so that it may be small as shown in FIGS. 3, 4 and 5. As mentioned above, the said anhedral angle Γ is controlled by the expansion limiters of the second and third shock absorbers

235, 236. Since the rear wing 300 is fixed, the cruising height of the WIG craft is determined by the speed and the weight of the WIG craft and the angle of incidence θ of the front wing 200. That is to say, if the angle of incidence θ is increased, the lift force is increased so that the cruising height gets to be high, and if the angle of incidence θ is decreased, the cruising height gets to be low. The said cruising height is adjusted depending upon the heights of the waves. When the WIG craft, which is cruising at extremely low altitude, collides with waves, most of the hydraulic pressure gets to be received by the trailing edge of the front wing 200. And, unlike most WIG crafts having the center of gravity far ahead of the trailing edge of the front wing, the WIG craft according to the present invention has the center of gravity 140 near to that since the rear wing 300 is large enough. Thus, unlike the conventional WIG crafts, the WIG craft according to the present invention would be disturbed little by wave impact. And the shocks received by it are also alleviated by shock absorbers, the WIG craft according to the present invention can fly very low with its front wing 200 being almost in touch with the water surface to utilize the extreme ground effect.

The WIG craft of the present invention would be quite stable even in taking off and landing on high waves when the electronic suspension control system is applied.

The direction is changed by thrust vectoring of the pivotal propeller 400 which installed in the tail of the body 100. To change the direction, the propulsion direction of the propeller 400 is changed, the tail of the WIG craft slips in the lateral direction according thereto, the rear wing 300 with the vertical stabilizers 320 banks through the dihedral effect. And with the angle of incidence θ of the front wing 200 which is increased by linking with thrust vectoring, the WIG craft makes a stable coordinate turn.

The change of direction is also used for avoiding obstacles.

To land on the water, the anhedral angle of the front wing 200, which was almost horizontal during cruising, is made to be large by adjusting the second shock absorber 235 and the third shock absorber 236. Thereby, the front wing 200 is made to have the inverted V-section hydroplane configuration as shown in FIGS. 6 and 7. Then, the thrust of the propeller 400 is lowered, and the WIG craft descends and both ends of the front wing 200 become in touch with the water surface and then plane. And the WIG craft decelerates while the shocks are absorbed by the shock absorbers. And as the rear wing 300 lands on the water lastly, the WIG craft gets to stop.

MODE FOR THE INVENTION

In addition to the first embodiment, the present invention may be embodied in several modified forms as needed.

Second Embodiment

Figure 10:
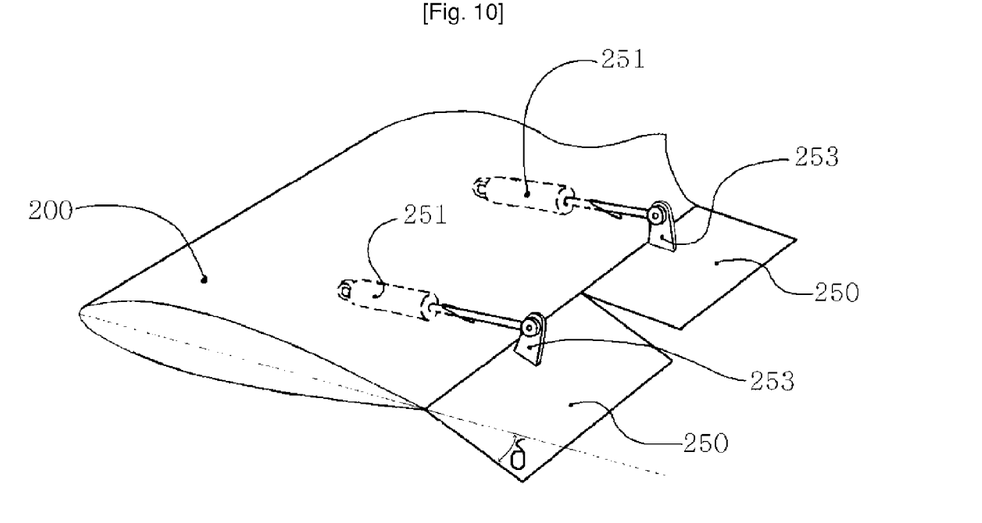
FIG. 10 is a conceptual diagram illustrating the second embodiment of the present invention.

The second embodiment of the WIG craft according to the present invention is explained by reference to FIG. 10.

The second embodiment is the same as the first embodiment except the point that a flexible flap is installed in the trailing edge of the front wing instead of installing a device to change the angle of incidence θ of the front wing 200. The flap 250 is made to be of a thin type. And it is divided into several sections, or it is made to have an elastic structure which can be somewhat twisted, to cover the cushion space tightly in the rough water surface. The first embodiment's function to change the anhedral angle Γ may be maintained or excluded according to circumstances. Explanation of what is the same as in the first embodiment is omitted, and only the differences between the first and the second embodiment and the effect resulting from them are explained.

In the second embodiment, the flap 250 sections are pivotaly installed in the trailing edge of the front wing 200 to have proper defection angle δ by several shock absorbers 251. And the trailing edges of the flexible flap 250 sections skim over the water surface and prevent the air from leaking rearward, thereby maximizing the ground effect. Each of the shock absorbers 251 comprises an air spring, a hydraulic damper and an expansion limiter. They are installed between the front wing 200 and the flap horns 253 and work like the first shock absorber of the first embodiment. The second embodiment of the present invention is used instead of the device which used for changing the angle of incidence θ of the first embodiment, if necessary.

The deflection angle δ of the flap 250 is adjusted, as needed.

If the front wing 200 and/or the flap 250 are tapered, an effective cushion space as in the reversed delta wing type WIG craft can be formed along with the anhedral angle Γ.

Third Embodiment

Figure 11:
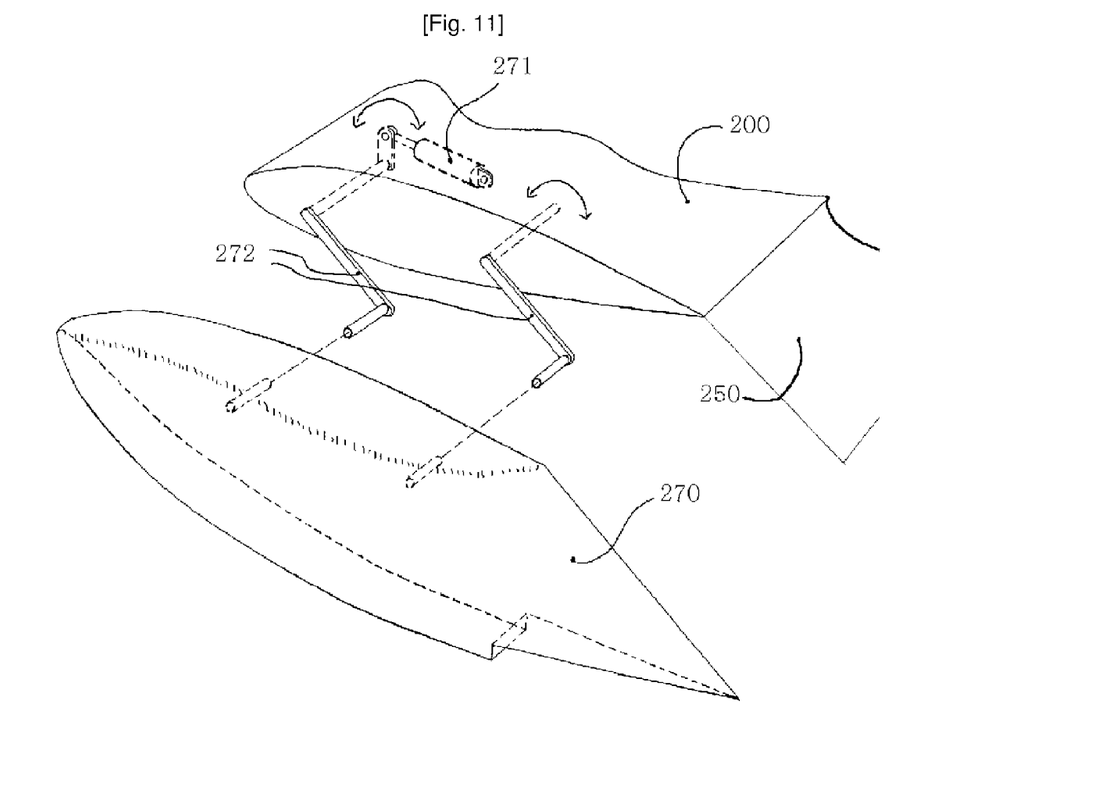
FIG. 11 is a conceptual diagram illustrating the third embodiment of the present invention.

Next, the third embodiment of the WIG craft according to the present invention is explained by reference to FIG. 11.

The third embodiment is the same as the first embodiment except that the front wing 200 has shock absorbing wingtip floats 270 instead of the device to change the anhedral angle Γ of the first embodiment and has the flap 250 of the second embodiment.

A pair floats 270 are installed through links (parallel crank 272, LM guide, etc.) at both ends of the front wing 200 of the third embodiment, and supported at a proper height by shock absorbers 271. Each shock absorber 271 comprises an air spring, a hydraulic damper and an expansion limiter. The configuration of the float 270 is a modification of a float for a common float plane as split in half right and left and it is made to have a sufficient height and length to prevent the cushion air from leaking sidewards. When the WIG craft starts to accelerate for taking off, the floats 270 are raised up along with the flap 250 above the surface to decrease hyrodynamic resistance. Then, after the WIG craft has accelerated to some extent through planing of the front wing 200, the floats 270 and flap 250 come down through activation of the shock absorbers 271, 251. Further, as the floats 270 plane over the water surface, the front wing 200 and the body 100 gets to be lifted by air springs of shock absorbers 271, and the shock which it receives and its up and down movements are alleviated and cleared by the shock absorbers 271. The travel range of folats 270 gets to be maximized when the WIG craft takes off and lands, and it gets to be small in cruise. It is the same as the travel range of the tips of the front wing 200 of the first embodiment or the travel range of the trailing edge of the flap 250 of the second embodiment. The wing tip floats 270 block the space between the front wing 200 and the water surface together with the flap 250. Thereby, it forms an effective cushion space as in a ram wing type WIG craft.

Fourth Embodiment

Figure 12:
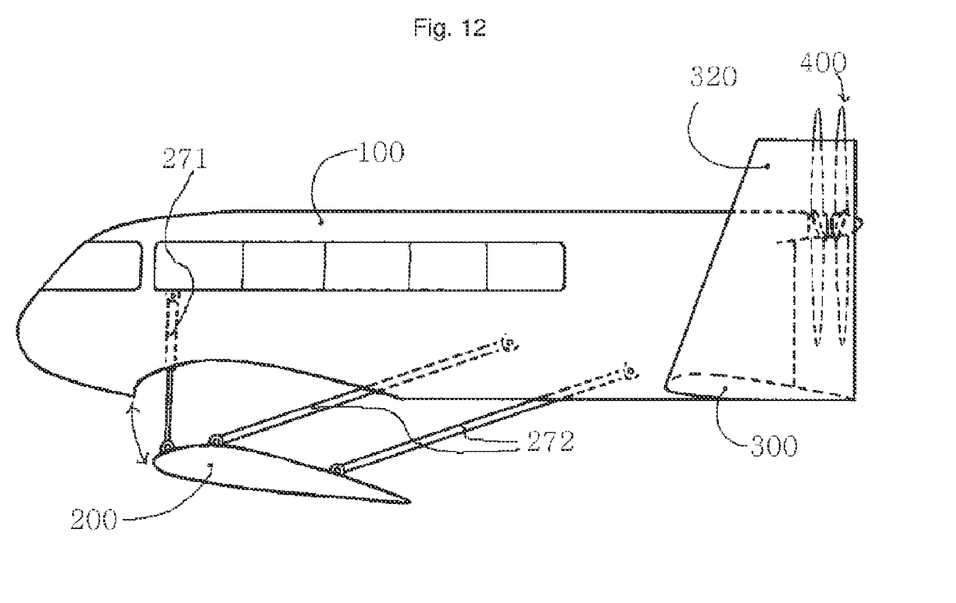
FIG. 12 is a conceptual diagram illustrating the fourth embodiment of the present invention.

Next, the fourth embodiment of the WIG craft according to the present invention is explained by reference to FIG. 12.

The fourth embodiment is applied to the case that the aspect ratio of the front wing 200 is relatively small, and it is the same as the first embodiment except that the entire front wing is made to travel up and down in respect of the body 100 instead of pivoting by which the anhedral angle Γ of the front wing 200 can be changed.

When the front wing 200 of the WIG craft according to the present invention has the aspect ratio of 2~3, there is no problem in planing even with no anhedral angle Γ.

A change in the interval between the front wing 200 and the body 100 gets to be maximized when the WIG craft takes off and lands. Thus, it is the same as the shock absorbing stroke of the said embodiments. While the WIG craft is cruising, it gets to be almost decreased so that the WIG craft is made to have a small shock absorbing stroke.

The fourth embodiment may applied together with either of the method of changing the angle of incidence θ in the first embodiment or the method of attaching the flap 250 in the second embodiment, or alone.

Industrial Applicability

As the tandem/canard WIG boat is provided by the present invention, the WIG craft gets to be able to take off and land even in high waves and cruise at ultra-low altitude, and its lift-to-drag ratio (fuel efficiency) is much improved through both the extreme ground effect of the front wing maintaining ultra-low height and the ground effect of the rear wing having a large aspect ratio and maintaining also low height, and the stability is enhanced in various aspects. Thus, while the WIG boat is cruising, all that pilot has to do is controlling the direction and the speed with no need to control others. As a result, the practicality of the WIG craft is much improved so that it can be commercialized earlier.

The invention claimed is:

1. A tandem or canard type WIG craft using the ground effect, comprising;
   a propeller equipped body;
   a buoyant front wing configured for planing on water surface and having an aspect ratio of less than 5, said front wing installed in the lowest section of the fore half of the body; and
   a buoyant rear wing having longer span and shorter chord length than the front wing, said rear wing installed in the lowest section of a rear half of the body at an angle of incidence so that the lift coefficient of the rear wing is equal to or larger than that of the front wing without the ground effect,
   wherein the center of gravity of the craft is positioned at a trailing edge of the front wing as seen in the top plan view, and wherein the front wing is used for planing on the water surface when the craft takes off from and lands on the water, and floats on water with the front and the rear wings while the craft is at rest.

2. The WIG craft according to claim 1, wherein the front wing is installed together with a suspension system having longitudinal axes so that the left part and the right part of the front wing may pivot up and down about the longitudinal axes with respect to the body to thereby change the anhedral angle, wherein due to the anhedral angle, the wingtip vortices are diminished while the craft is cruising and the craft planes with the lower surfaces of outward portions of the front wing when the craft takes off from and lands on the water, and wherein when the planing surface of the front wing receives an excessive external force, the anhedral angle is decreased and at the same time, shock absorbers of the suspension system works to absorb the shock.

3. The WIG craft according to claim 1, wherein the front wing is installed together with a suspension system so that it may pivot up and down about a transverse axis with respect to the body to change the angle of incidence wherein when the underside of the front wing receives an excessive external force, the angle of incidence is decreased and at the time, shock absorber of the suspension system works to absorb the shock.

4. The WIG craft according to claim 1, wherein flaps are installed together with shock absorbers in the trailing edge of the front wing, wherein the flaps are arranged to deflect down to prevent high pressurized air under the front wing from leaking rearward while the craft flies very low, and wherein when the underside of the flaps receive an excessive external force, the defection angle is decreased and at the same time, shock absorbers of the suspension system work to absorb the shock.

5. The WIG craft according to claim 4, wherein a pair of floats are installed at both ends of the front wing through suspension systems, wherein the floats prevent the high pressurized air under the front wing from leaking sidewards while the craft flies very low, and wherein the floats travel up and down along the waves when they plane on the water surface, and at the same time, the shock absorbers of the suspension system works to absorb the shock.

6. The WIG craft according to claim 1, wherein the front wing is installed through a suspension system so that the entire front wing may travel up and down with respect to the body, and thereby, an interval between the front wing and the body can be changed, and if the underside of the front wing receives an excessive external force, the interval is decreased and at the same time, shock absorber of the suspension system works to absorb the shock.

* * * * *